(12) United States Patent
Kelnhofer et al.

(10) Patent No.: US 9,976,684 B2
(45) Date of Patent: May 22, 2018

(54) METHOD AND SYSTEM FOR CONTROLLING AN AUXILIARY POWER UNIT

(71) Applicant: AIRBUS OPERATIONS GMBH, Hamburg (DE)

(72) Inventors: Jurgen Kelnhofer, Hamburg (DE); Dariusz Krakowski, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 565 days.

(21) Appl. No.: 13/692,672

(22) Filed: Dec. 3, 2012

(65) Prior Publication Data
US 2013/0139891 A1 Jun. 6, 2013

Related U.S. Application Data

(60) Provisional application No. 61/567,161, filed on Dec. 6, 2011.

(30) Foreign Application Priority Data

Dec. 6, 2011 (DE) .......................... 10 2011 120 322

(51) Int. Cl.
*F16L 53/00* (2018.01)
*B64D 13/06* (2006.01)
*F02C 6/06* (2006.01)

(52) U.S. Cl.
CPC ............ *F16L 53/001* (2013.01); *B64D 13/06* (2013.01); *F02C 6/06* (2013.01);
(Continued)

(58) Field of Classification Search
CPC . B64D 13/06; B64D 13/08; B64D 2013/0611
(Continued)

(56) References Cited

U.S. PATENT DOCUMENTS

| 3,711,044 A | 1/1973 | Matulich |
| 4,419,926 A | 12/1983 | Cronin |

(Continued)

FOREIGN PATENT DOCUMENTS

| DE | 41 37 765 | 5/1993 |
| DE | 10 2008 053 320 | 5/2010 |

(Continued)

*Primary Examiner* — Steven B McCallister
*Assistant Examiner* — Ko-Wei Lin
(74) *Attorney, Agent, or Firm* — Dickinson Wright PLLC

(57) ABSTRACT

A method for controlling the operation of an auxiliary power unit supplying an aircraft air conditioning system with compressed process air includes determining a heating or cooling requirement of an aircraft region to be air-conditioned, determining a desired value of at least one process air flow parameter in dependence on the determined heating or cooling requirement of the aircraft region to be air-conditioned, controlling the operation of the auxiliary power unit in dependence on the determined process air flow parameter desired value, acquiring an actual value of the at least one process air flow parameter, comparing the process air flow parameter actual value with the process air flow parameter desired value and controlling the operation of the auxiliary power unit in dependence on the result of the comparison of the process air flow parameter actual value with the process air flow parameter desired value.

12 Claims, 4 Drawing Sheets

(52) U.S. Cl.
CPC .. *B64D 2013/0611* (2013.01); *F05D 2220/50* (2013.01); *F05D 2270/306* (2013.01); *Y02T 50/56* (2013.01); *Y10T 137/0318* (2015.04); *Y10T 137/6416* (2015.04)

(58) Field of Classification Search
USPC .......................................................... 454/76
See application file for complete search history.

(56) References Cited

U.S. PATENT DOCUMENTS

| | | | |
|---|---|---|---|
| 5,934,083 A * | 8/1999 | Scherer | B64D 13/08 62/172 |
| 2006/0201173 A1* | 9/2006 | Leathers | |
| 2007/0130970 A1* | 6/2007 | Schwan et al. | 62/180 |
| 2007/0271952 A1* | 11/2007 | Lui et al. | 62/402 |
| 2009/0084122 A1* | 4/2009 | Casado Montero | 62/244 |
| 2010/0101251 A1 | 4/2010 | Kelnhofer | |
| 2012/0064816 A1 | 3/2012 | Krakowski et al. | |
| 2013/0067945 A1 | 3/2013 | Kelnhofer | |
| 2013/0073123 A1 | 3/2013 | Westenberger | |

FOREIGN PATENT DOCUMENTS

| | | |
|---|---|---|
| DE | 10 2009 010 546 | 9/2010 |
| DE | 10 2010 011 416 | 9/2011 |
| DE | 10 2010 013 956 | 10/2011 |
| DE | 10 2010 054 448 | 6/2012 |
| WO | 92/00877 | 1/1992 |

* cited by examiner

METHOD AND SYSTEM FOR CONTROLLING AN AUXILIARY POWER UNIT

CROSS REFERENCE TO RELATED APPLICATION

This application is entitled to and claims priority of U.S. 61/567,161 filed Dec. 6, 2011 and DE 10 2011 120 322.6 filed Dec. 6, 2011, the disclosures of each of which, including the specification, drawings and abstract, are incorporated herein by reference in their entirety.

FIELD

The present invention relates to a method and a system for controlling the operation of an auxiliary power unit supplying an aircraft air conditioning system with compressed process air.

BACKGROUND

So-called air-based air conditioning systems are usually used at present in commercial aircraft to air-condition the aircraft cabin, as described for example in DE 10 2008 053 320 A1 or the non-prior-published DE 10 2010 054 448. An aircraft air conditioning system serves to cool the aircraft cabin, which would otherwise be overheated due to thermal loads, such as, e.g. insulation, body heat of the passengers and waste heat from equipment present on board the aircraft. The aircraft air conditioning system in addition adequately supplies fresh air into the aircraft cabin to ensure that a prescribed minimum proportion of oxygen is present in the aircraft cabin.

Air-based air conditioning systems generally comprise an air conditioning unit, which is supplied with process air compressed by the engines of the aircraft, a separate compressor or an auxiliary power unit (APU). When the aircraft is in flight, predominantly engine bleed air is used to supply the air conditioning unit of the aircraft air conditioning system with compressed process air. By contrast, when the aircraft is on the ground, the air conditioning unit of the aircraft air conditioning system is usually supplied with process air compressed by the auxiliary power unit. In the air conditioning unit, the process air is cooled and expanded as it flows through at least one heat exchanger unit and various compression and expansion units. Finally, cooled process air leaving the air conditioning unit is led into a mixing chamber and mixed there with recirculation air discharged from an aircraft region to be air-conditioned. The mixed air from the mixing chamber is led via corresponding mixed air lines into the aircraft region to be air-conditioned which is optionally subdivided into different air conditioning zones. The aircraft region to be air-conditioned may be a passenger cabin, a cockpit, a cargo compartment, a crew rest compartment or the like.

SUMMARY

The object on which the invention is based is to provide an energy-efficient method and system for controlling the operation of an auxiliary power unit used to supply an aircraft air conditioning system with compressed process air.

This object is achieved by a method for controlling the operation of an auxiliary power unit supplying an aircraft air conditioning system with compressed process air having the features of Claim 1 and a system for controlling the operation of an auxiliary power unit supplying an aircraft air conditioning system with compressed process air having the features of Claim 7.

In a method according to the invention for controlling the operation of an auxiliary power unit supplying an aircraft air conditioning system with compressed process air, first a heating requirement or a cooling requirement of an aircraft region to be air-conditioned is determined. The aircraft region to be air-conditioned may be an aircraft passenger cabin, a cockpit, a cargo compartment or another aircraft region. The heating or cooling requirement of the aircraft region to be air-conditioned may be determined, for example, on the basis of a comparison of a desired temperature in the aircraft region to be air-conditioned with an actual temperature, measured for example by a sensor, in the aircraft region to be air-conditioned. The desired temperature in the aircraft region to be air-conditioned may, for example, be preset by a user or stored in a memory of a preferably electronic control unit for controlling the operation of the aircraft air conditioning system. The determination of the heating or cooling requirement of the aircraft region to be air-conditioned is preferably effected likewise by the control unit for controlling the operation of the aircraft air conditioning system.

In dependence on the determined heating or cooling requirement of the aircraft region to be air-conditioned, a desired value of at least one process air flow parameter is determined, for example, likewise by the control unit of the aircraft air conditioning system. A process air flow parameter is to be understood here as a parameter which is characteristic of the properties of a flow of compressed process air which is tapped off from the auxiliary power unit and can be supplied to an air conditioning unit of the aircraft air conditioning system. If the aircraft region to be air-conditioned has a high heating or cooling requirement, i.e. for example the actual temperature in the aircraft region to be air-conditioned deviates greatly from the desired temperature in the aircraft region to be air-conditioned, there is generally also a high process air requirement. Conversely, the process air requirement is generally comparatively lower if the heating or cooling requirement of the aircraft region to be air-conditioned is low. The process air flow parameter desired value determined in the context of the method according to the invention is thus characteristic of the process air requirement required to meet the determined heating or cooling requirement of the aircraft region to be air-conditioned.

The operation of the auxiliary power unit is then controlled first in dependence on the determined process air flow parameter desired value. The control of the operation of the auxiliary power unit may be performed by a preferably electronic auxiliary power unit control unit, to which the process air flow parameter desired value is transmitted by the control unit of the aircraft air conditioning system. The signal transmission between the control unit of the aircraft air conditioning system and the auxiliary power unit control unit may be effected via corresponding signal transmission lines or wirelessly.

In the next step, an actual value of the at least one process air flow parameter is acquired. In other words, a monitoring takes place, for example by sensors, of the process air flow parameter for which the aircraft air conditioning system has determined a heating- or cooling-requirement-dependent desired value and which forms the basis for the control of the operation of the auxiliary power unit by the auxiliary power unit control unit. In the next step, the acquired actual value of the at least one process air flow parameter is compared with the desired value of the at least one process air flow parameter. This actual/desired value comparison makes it possible to check whether the operation of the auxiliary power unit under the control of the auxiliary power unit control unit actually results in the desired process air flow parameter desired value and consequently the heating or cooling requirement of the aircraft region to be air-conditioned can be met, as desired.

The actual value, acquired for example by sensors, of the at least one process air flow parameter preferably is supplied to the control unit of the aircraft air conditioning system, which may also carry out the actual/desired value comparison. The result of the actual/desired value comparison may then be transmitted by the control unit of the aircraft air conditioning system to the auxiliary power unit control unit. Alternatively to this, the actual value of the at least one process air flow parameter may also be supplied directly to the auxiliary power unit control unit, which then may also carry out the actual/desired value comparison. Finally, it is conceivable to transmit the actual value of the at least one process air flow parameter first to the control unit of the aircraft air conditioning system, which then passes on this value to the auxiliary power unit control unit for carrying out the actual/desired value comparison.

Finally, the operation of the auxiliary power unit is controlled in dependence on the result of the comparison of the acquired actual value of the at least one process air flow parameter with the desired value of the at least one process air flow parameter, i.e. the operation of the auxiliary power unit is adapted to the result of the actual/desired value comparison. If the comparison of the process air flow parameter actual value with the process air flow parameter desired value shows that these two values do not deviate from one another, the control of the operation of the auxiliary power unit is maintained. By contrast, if the comparison of the process air flow parameter actual value with the process air flow parameter desired value shows a difference between the process air flow parameter actual value and the process air flow parameter desired value, the auxiliary power unit control unit adapts the control parameters for controlling the operation of the auxiliary power unit, accordingly. An adaptation of the control of the operation of the auxiliary power unit may be effected, for example, if the difference between the process air flow parameter actual value and the process air flow parameter desired value exceeds a predetermined threshold value.

For example, the operating intensity of the auxiliary power unit may be corrected downwards if the comparison of the acquired actual value of the at least one process air flow parameter with the desired value of the at least one process air flow parameter shows that the auxiliary power unit produces more process air than is required to meet the heating or cooling requirement of the aircraft region to be air-conditioned. Conversely, the operating intensity of the auxiliary power unit may be increased if the comparison of the actual value of the at least one process air flow parameter with the desired value of the at least one process air flow parameter reveals that the process air flow produced by the auxiliary power unit is not sufficient to enable the aircraft air conditioning system to meet the heating or cooling requirement of the aircraft region to be air-conditioned.

The method according to the invention for controlling the operation of an auxiliary power unit supplying an aircraft air conditioning system with compressed process air thus makes it possible to detect and eliminate a difference between the process air requirement of the aircraft air conditioning system and the process air flow delivered by the auxiliary power unit. The method thus ensures that the aircraft air conditioning system is always able to meet the heating or cooling requirement of the aircraft region to be air-conditioned. Moreover, the auxiliary power unit is prevented from operating with excessive operating intensity. Rather, the method according to the invention enables the auxiliary power unit to operate always in the region of an optimal operating point. As a result, the fuel consumption of the auxiliary power unit is minimised and a reduction of the service life of the auxiliary power unit due to overloading is prevented.

At least one of a volume flow, a mass flow, a temperature and a pressure of the compressed process air supplied to an air conditioning unit of the aircraft air conditioning system by the auxiliary power unit may, for example, be used as the process air flow parameter, i.e. as the parameter characteristic of the process air flow provided by the auxiliary power unit. In the control method according to the invention, it is possible to use just one process air flow parameter. If desired, however, it is also possible to have recourse to a plurality of process air flow parameters.

In a preferred embodiment of the method according to the invention for controlling the operation of an auxiliary power unit supplying an aircraft air conditioning system with compressed process air, furthermore an actual value of at least one air conditioning system operating parameter characteristic of the operating state of the aircraft air conditioning system is acquired. Preferably, a parameter, the changing of which results in a change of the process air requirement of the aircraft air conditioning system, is used as the air conditioning system operating parameter. The acquisition of the air conditioning system operating parameter actual value may be effected by sensors or by calculation. The air conditioning system operating parameter actual value may be supplied to the control unit of the aircraft air conditioning system or be determined by the control unit of the aircraft air conditioning system. The control unit of the aircraft air conditioning system transmits the air conditioning system operating parameter actual value preferably to the auxiliary power unit control unit.

The operation of the auxiliary power unit is then preferably controlled in dependence on the actual value of the at least one air conditioning system operating parameter characteristic of the operating state of the aircraft air conditioning system. In other words, in controlling the operation the auxiliary power unit control unit preferably takes account not only of any actual/desired value deviation of the at least one process air flow parameter, but also of the operating state of the aircraft air conditioning system, in particular of the operating intensity of the auxiliary power unit. By additionally taking account of an air conditioning system operating parameter actual value in controlling the operation of the auxiliary power unit, a control of the auxiliary power unit operation which is even more in line with the process air requirement is possible.

At least one of the heating or cooling requirement of the aircraft region to be air-conditioned, an air conditioning system capacity utilisation parameter characteristic of the capacity utilisation state of the aircraft air conditioning system and an air conditioning system fault parameter characteristic of an apparatus fault or a system fault of the aircraft air conditioning system may be used as the air conditioning system operating parameter. In controlling the auxiliary power unit operation, it is possible to take account of just one air conditioning system operating parameter. It is, however, also possible to take account of a plurality of air conditioning system operating parameters in controlling the operation of the auxiliary power unit.

The actual value of the at least one process air flow parameter may be acquired by an acquiring device which is integrated in the aircraft air conditioning system and the signals of which are also used to control the operation of the aircraft air conditioning system. For example, at least one of a volume flow sensor and a mass flow sensor integrated in the aircraft air conditioning system, a temperature sensor integrated in the aircraft air conditioning system and a pressure sensor integrated in the aircraft air conditioning system may be used to acquire the actual value of the process air flow parameter. Additionally or alternatively to this, the actual value of the air conditioning system operating parameter may also be acquired by an acquiring device which is integrated in the aircraft air conditioning system and the signals of which are also used to control the operation of the aircraft air conditioning system. By using an acquiring device which is integrated in the aircraft air conditioning system anyway, the provision of an additional acquiring device can be dispensed with. The method according to the invention can therefore by carried out without structural alterations to the aircraft air conditioning system or the auxiliary power unit.

The actual value of the at least one process air flow parameter is preferably continuously acquired. Additionally or alternatively to this, the actual value of the air conditioning system operating parameter may also be continuously acquired. On the basis of a continuous actual value acquisition, the operation of the auxiliary power unit may also be continuously controlled in dependence on the result of the comparison of the process air flow parameter actual value with the process air flow parameter desired value or in dependence on the comparison of the air conditioning system operating parameter actual value with the air conditioning system operating parameter desired value. This enables a particularly efficient operation of the auxiliary power unit.

A system according to the invention for controlling the operation of an auxiliary power unit supplying an aircraft air conditioning system with compressed process air comprises a device for determining a desired value of at least one process air flow parameter in dependence on a heating or cooling requirement of an aircraft region to be air-conditioned. This device may be formed, for example, by a preferably electronic control unit of the aircraft air conditioning system or be integrated in such a control unit. Furthermore, the system according to the invention comprises a device for acquiring an actual value of the at least one process air flow parameter. Moreover, there is provided a device for controlling the operation of the auxiliary power unit, which is designed to control the operation of the auxiliary power unit first in dependence on the determined process air flow parameter desired value, and which is furthermore designed to control the operation of the auxiliary power unit, after the acquiring of the actual value of the at least one process air flow parameter, in dependence on the result of a comparison of the acquired actual value of the at least one process air flow parameter with the desired value of the at least one process air flow parameter.

At least one of a volume flow, a mass flow, a temperature and a pressure of the compressed process air supplied to the aircraft air conditioning system by the auxiliary power unit may be used as the process the air flow parameter.

The system may furthermore comprise a device for acquiring an actual value of at least one air conditioning system operating parameter characteristic of the operating state of the aircraft air conditioning system. Furthermore, the device for controlling the operation of the auxiliary power unit may be designed to control the operation of the auxiliary power unit in dependence on the acquired actual value of the at least one air conditioning system operating parameter characteristic of the operating state of the aircraft air conditioning system.

At least one of the heating or cooling requirement of the aircraft region to be air-conditioned, an air conditioning system capacity utilisation parameter characteristic of the capacity utilisation state of the aircraft air conditioning system and an air conditioning system fault parameter characteristic of an apparatus fault or a system fault of the aircraft air conditioning system may be used as the air conditioning system operating parameter.

The device for acquiring the actual value of the at least one process air flow parameter may be a device which is integrated in the aircraft air conditioning system and the signals of which are also used to control the operation of the aircraft air conditioning system. Additionally or alternatively to this, the device for acquiring the actual value of the air conditioning system operating parameter may be a device which is integrated in the aircraft air conditioning system and the signals of which are also used to control the operation of the aircraft air conditioning system.

At least one of the device for acquiring the actual value of the at least one process air flow parameter and the device for acquiring the actual value of the air conditioning system operating parameter is preferably designed to continuously acquire at least one of the actual value of the at least one process air flow parameter and the actual value of the air conditioning system operating parameter.

At least one of the method according to the invention and the system according to the invention for controlling the operation of an auxiliary power unit supplying an aircraft air conditioning system with compressed process air is particularly advantageously usable when an aircraft is on the ground. When the aircraft is in flight, the aircraft air conditioning system is generally supplied with compressed process air by the main engines of the aircraft. In the event of a fault, i.e. in a case where the auxiliary power unit is also active when the aircraft is in flight, the method according to the invention and the system according to the invention may, however, also be employed when the aircraft is in flight.

BRIEF DESCRIPTION OF THE DRAWINGS

A preferred embodiment of the invention will now be explained in more detail with the aid of the appended schematic drawings, of which

DETAILED DESCRIPTION OF EMBODIMENTS

Figure 1:
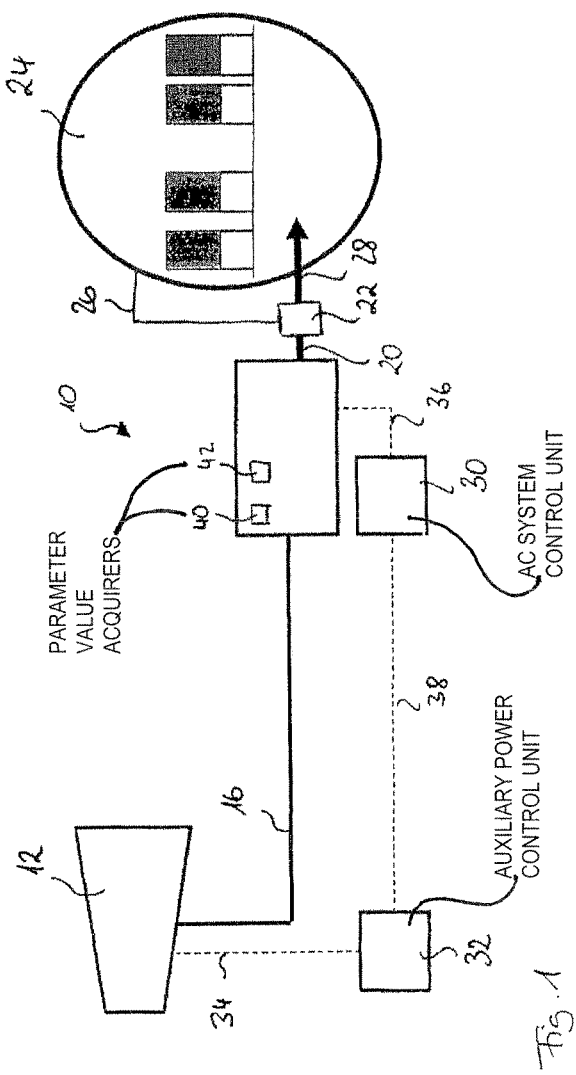
FIG. 1 shows an aircraft air conditioning system supplied with compressed process air by an auxiliary power unit.
Figure 2:
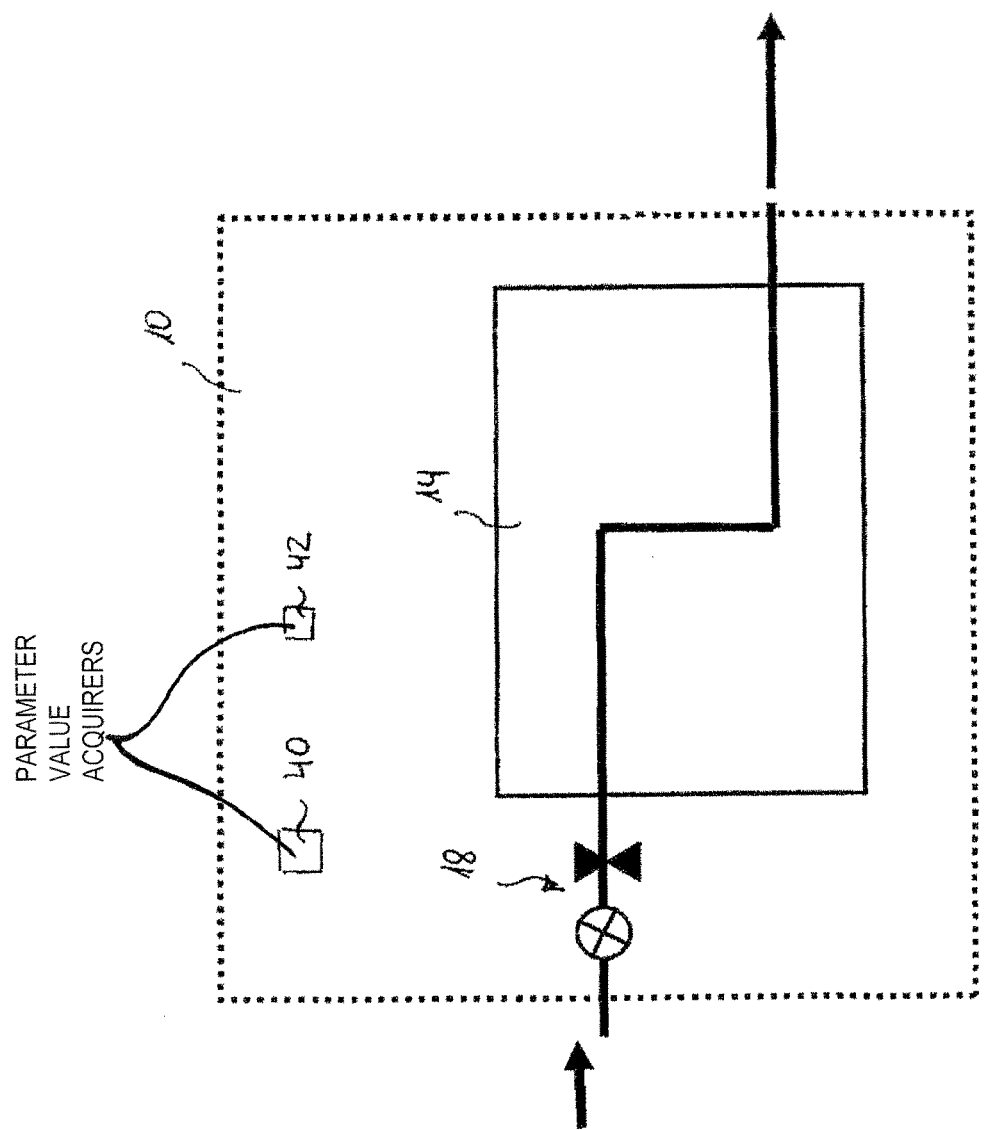
FIG. 2 shows a detail illustration of the aircraft air conditioning system according to FIG. 1.

FIG. 1 shows an aircraft air conditioning system 10 which is supplied with compressed process air by an auxiliary power unit 12 when the aircraft is on the ground. The compressed process air generated by the auxiliary power unit 12 is supplied to the aircraft air conditioning system 10, i.e. to an air conditioning unit 14 of the aircraft air conditioning system 10, via a pipe 16. As can be seen in FIG. 2, there is arranged in the pipe 16 a valve 18 which controls the supply of compressed process air into the air conditioning unit 14 of the aircraft air conditioning system 10. In the air conditioning unit 14, the process air is cooled and expanded as it flows through at least one heat exchanger unit and various compression and expansion units. Via a further pipe 20, the cooled process air leaving the air conditioning unit 14 is led into a mixing chamber 22 and mixed there with recirculation air discharged from an aircraft region 24 to be air-conditioned. The pipe connecting the aircraft region 24 to be air-conditioned to the mixing chamber 22 is denoted by 26 in FIG. 1. The mixed air from the mixing chamber 22 is finally led via a mixed air line 28 into the aircraft region 24 to be air-conditioned.

The operation of the aircraft air conditioning system 10 is controlled by means of an electronic control unit 30. By contrast, an electronic control unit 32 serves to control the operation of the auxiliary power unit 12. A first signal line 34 connects the auxiliary power unit control unit 32 to the auxiliary power unit 12. By contrast, a second signal line 36 connects the electronic control unit 30 to the aircraft air conditioning system. Finally, the control units 30, 32 communicate via a third signal line 38. The signal lines 34, 36, 38 may be signal transmission lines. Alternatively to this, however, the signal lines 34, 36, 38 may also take the form of wireless signal transmission connections.

Figure 3:
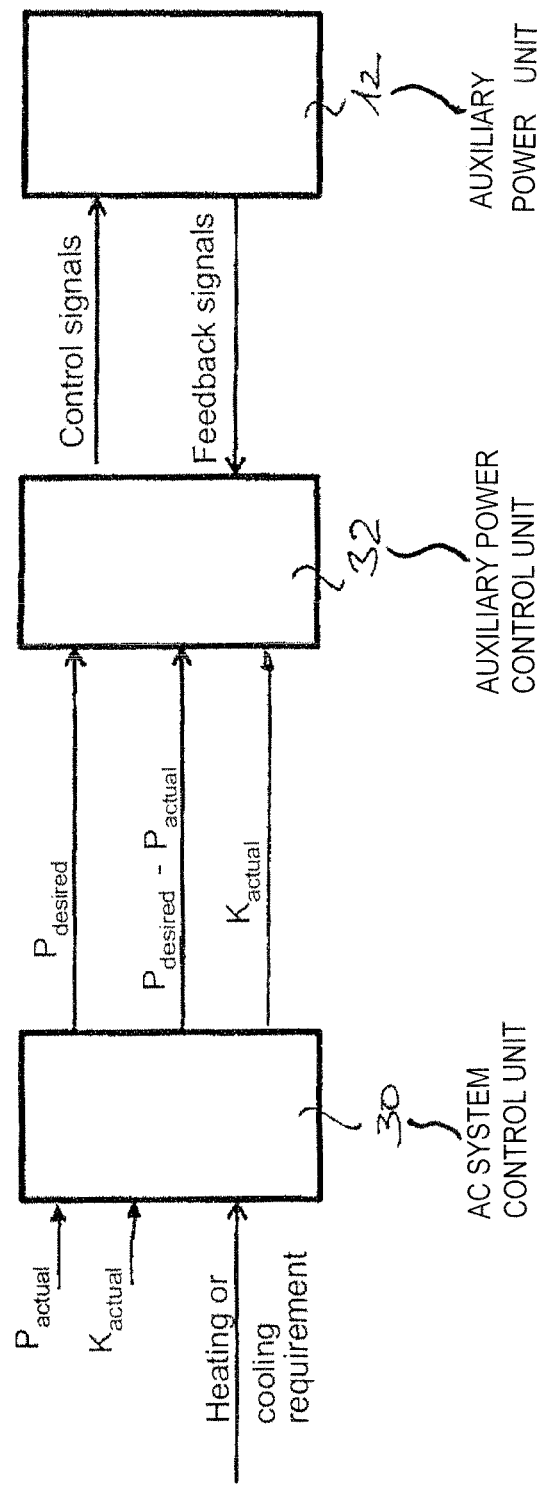
FIG. 3 shows an illustration of the control of the auxiliary power unit according to FIG. 1.
Figure 4:
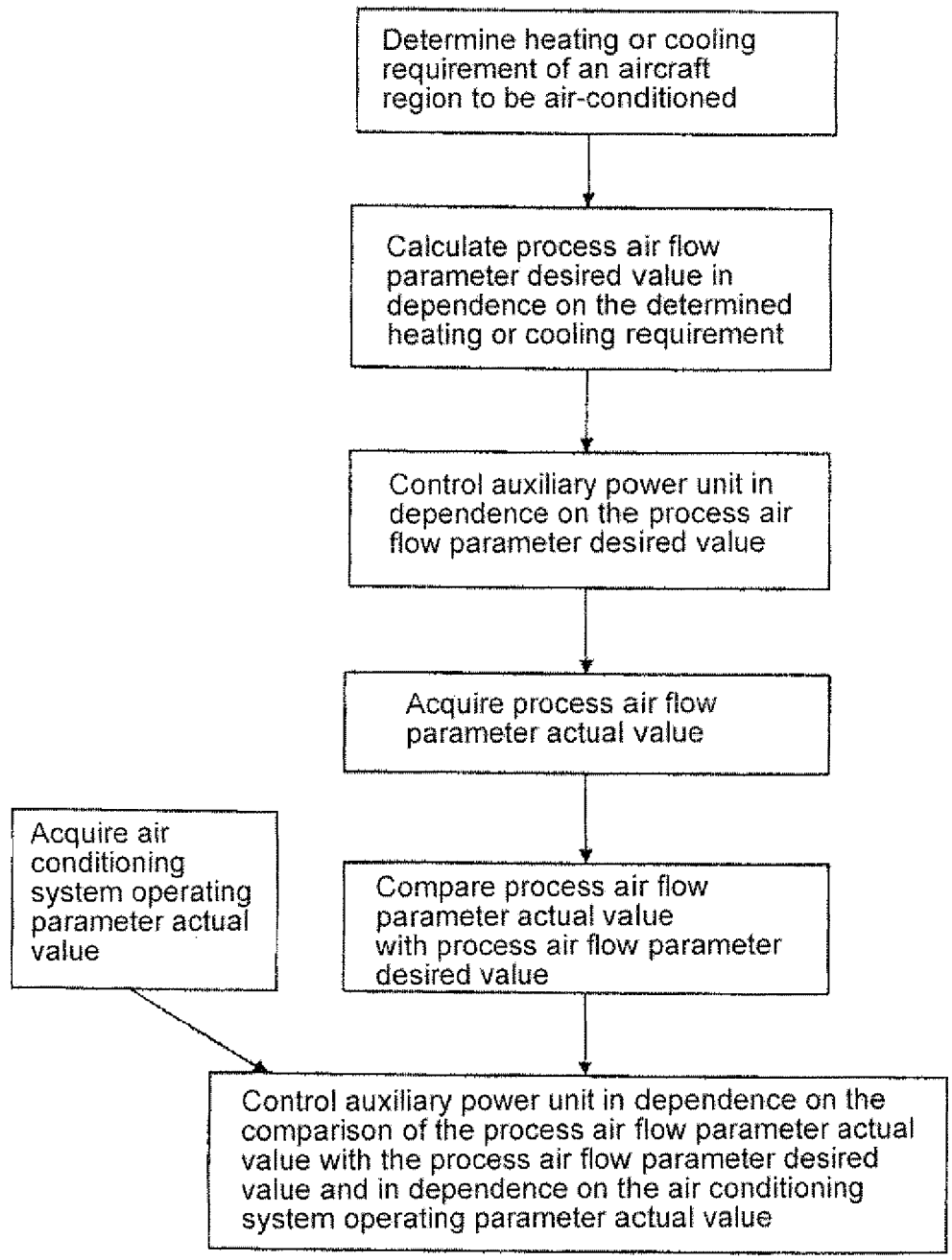
FIG. 4 shows a flow chart of a method for controlling the operation of the auxiliary power unit according to FIG. 1.

In the following, the operation of the aircraft air conditioning system 10 and the auxiliary power unit 12 will be discussed with reference to FIGS. 3 and 4. On starting the operation of the aircraft air conditioning system 10, first of all the heating or cooling requirement of the aircraft region 24 to be air-conditioned is determined by the electronic control unit 30 of the aircraft air conditioning system 10. The heating or cooling requirement of the aircraft region 24 to be air-conditioned may be determined, for example, on the basis of a comparison between an actual temperature in the aircraft region 24 to be air-conditioned with a desired temperature in the aircraft region 24 to be air-conditioned. The actual temperature in the aircraft region 24 to be air-conditioned may be acquired, for example, by means of a temperature sensor arranged in the aircraft region 24 to be air-conditioned. By contrast, the desired temperature in the aircraft region 24 to be air-conditioned may, for example, be preset by a user or stored in a memory of the electronic control unit 30.

On the basis of the determined heating or cooling requirement of the aircraft region 24 to be air-conditioned, the electronic control unit 30 determines a desired value $P_{desired}$ of at least one process air flow parameter P. At least one of a volume flow, a mass flow, a temperature and a pressure of the compressed process air supplied to the air conditioning unit 14 of the aircraft air conditioning system 10 by the auxiliary power unit 12 may be used as the process air flow parameter P. The desired value $P_{desired}$ of the process air flow parameter P reflects the process air requirement which the aircraft air conditioning system 10 has in order to be able to meet the heating or cooling requirement of the aircraft region 24 to be air-conditioned. The process air flow parameter desired value $P_{desired}$ is transmitted to the control unit 32 of the auxiliary power unit 12 by the control unit 30 of the aircraft air conditioning system 10 (see FIG. 3). The auxiliary power unit control unit 32 then controls the operation of the auxiliary power unit 12 first in dependence on the process air flow parameter desired value $P_{desired}$. In controlling the operation of the auxiliary power unit 12, the control unit 32 furthermore takes account of feedback signals which are supplied to the control unit 32 by the auxiliary power unit 12.

When the aircraft air conditioning system 10, or the air conditioning unit 14 of the aircraft air conditioning system 10, is being supplied with compressed process air by the auxiliary power unit 12, an actual value $P_{actual}$ of the at least one process air flow parameter P is continuously acquired. For this purpose, use is made of an acquiring device 40 which is present in the aircraft air conditioning system anyway and the signals of which are also used by the control unit 30 to control the operation of the aircraft air conditioning system 10. The acquiring device 40 may be a volume flow or mass flow sensor, a temperature sensor or pressure sensor, depending on the nature of the process air flow parameter P. If desired, a plurality of process air flow parameters P may also be used in controlling the operation of the auxiliary power unit 12. Accordingly, the control unit 30 of the aircraft air conditioning system 10 then also evaluates the signals of a plurality of acquiring devices 40 suitable for measuring these process air flow parameters. The actual value $P_{actual}$ of the process air flow parameter P is continuously acquired.

Furthermore, an actual value of at least one air conditioning system operating parameter K characteristic of the operating state of the aircraft air conditioning system 10 is continuously acquired by an acquiring device 42 likewise integrated in the aircraft air conditioning system 10. For example, at least one of an air conditioning system capacity utilisation parameter characteristic of the capacity utilisation state of the aircraft air conditioning system 10 and an air conditioning system fault parameter characteristic of an apparatus fault or a system fault of the aircraft air conditioning system 10 may be used as the air conditioning system operating parameter K acquired by the acquiring device 42. Furthermore, the heating or cooling requirement of the aircraft region 24 to be air-conditioned may be taken into account as the air conditioning system operating parameter K. The parameter acquisition may be carried out by sensors or by corresponding evaluation processes in the control unit 30 for controlling the operation of the aircraft air conditioning system 10. The actual value $K_{actual}$ of the air conditioning system operating parameter K characteristic of the operating state of the aircraft air conditioning system 10 is transmitted to the auxiliary power unit control unit 32 by the electronic control unit 30 of the aircraft air conditioning system 10.

In the next step, the control unit 30 of the aircraft air conditioning system 10 carries out a comparison of the process air flow parameter actual value $P_{actual}$ acquired by the acquiring device 40 with the process air flow parameter desired value $P_{desired}$. The result of this comparison, i.e. the deviation $(P_{desired}-P_{actual})$ of the process air flow parameter actual value $P_{actual}$ from the process air flow parameter desired value $P_{desired}$, is then transmitted by the control unit 30 of the aircraft air conditioning system 10 to the auxiliary power unit control unit 32.

In what follows, the auxiliary power unit control unit 32 in controlling the operation of the auxiliary power unit 12 then takes account not only of the process air flow parameter desired value $P_{desired}$, but also the deviation $(P_{desired}-P_{actual})$ of the process air flow parameter actual value $P_{actual}$ from the process air flow parameter desired value $P_{desired}$. Furthermore, the actual value of the air conditioning system operating parameter $K_{actual}$, which is characteristic of the operating state of the aircraft air conditioning system 10 and influences the process air requirement of the aircraft air conditioning system 10 during operation, is also taken into account. This enables a control of the operation of the auxiliary power unit 12 in a manner which is always adapted to the current process air requirement of the aircraft air conditioning system 10.

The invention claimed is:

1. A method for controlling operation of an auxiliary power unit supplying an air conditioning system of an aircraft with compressed process air in ground operation of the aircraft, comprising:
    (a) determining a heating or cooling requirement of an aircraft region to be air-conditioned,
    (b) determining a desired value of at least one process air flow parameter for a process air flow in a region between the auxiliary power unit and the air conditioning system in dependence on the heating or cooling requirement of the aircraft region to be air-conditioned determined in step (a), the process air flow parameter being characteristic of the properties of a flow of compressed process air which is tapped off from the auxiliary power unit and supplied to the aircraft air conditioning system, wherein at least one of a volume flow, a mass flow, a temperature and a pressure of the compressed process air supplied to the aircraft air conditioning system by the auxiliary power unit is used as the process air flow parameter,
    (c) controlling the operation of the auxiliary power unit in dependence on the process air flow parameter desired value determined in step (b),
    (d) acquiring an actual value of the at least one process air flow parameter characteristic of the properties of the process air flow in said region between the auxiliary power unit and the air conditioning system,
    (e) comparing the process air flow parameter actual value with the process air flow parameter desired value and
    (f) controlling the operation of the auxiliary power unit in dependence on a result of comparison in step (e) of the process air flow parameter actual value with the process air flow parameter desired value.

2. The method according to claim 1, further comprising:
acquiring an actual value of at least one air conditioning system operating parameter characteristic of an operating state of the aircraft air conditioning system and
controlling the operation of the auxiliary power unit in dependence on the air conditioning system operating parameter actual value.

3. The method according to claim 2,
wherein at least one of the heating or cooling requirement of the aircraft region to be air-conditioned, an air conditioning system capacity utilisation parameter characteristic of a capacity utilisation state of the aircraft air conditioning system and an air conditioning system fault parameter characteristic of an apparatus fault or a system fault of the aircraft air conditioning system is used as the air conditioning system operating parameter.

4. The method according to claim 2,
wherein at least one of the process air flow parameter actual value and the air conditioning system operating parameter actual value is acquired by an acquiring device which is integrated in the aircraft air conditioning system and the signals of which are also used to control the operation of the aircraft air conditioning system.

5. The method according to claim 2,
wherein at least one of the process air flow parameter actual value and the air conditioning system operating parameter actual value is continuously acquired.

6. A system for controlling operation of an auxiliary power unit supplying an air conditioning system of an aircraft with compressed process air in ground operation of the aircraft, which comprises:
    a determiner configured to determine a desired value of at least one process air flow parameter for a process air flow in a region between the auxiliary power unit and the air conditioning system in dependence on a heating or cooling requirement of an aircraft region to be air-conditioned, the process air flow parameter being characteristic of the properties of a flow of compressed process air which is tapped off from the auxiliary power unit and supplied to the aircraft air conditioning system, wherein at least one of a volume flow, a mass flow, a temperature and a pressure of the compressed process air supplied to the aircraft air conditioning system by the auxiliary power unit is used as the process air flow parameter,
    an acquirer configured to acquire an actual value of the at least one process air flow parameter characteristic of the properties of the process air flow in said region between the auxiliary power unit and the air conditioning system, and
    a controller configured to control the operation of the auxiliary power unit, by controlling the operation of the auxiliary power unit first in dependence on the process air flow parameter desired value determined by said determiner, and by controlling the operation of the auxiliary power unit, after the acquirer acquires the process air flow parameter actual value, in dependence on a result of a comparison of the process air flow parameter actual value with the process air flow parameter desired value.

7. The system according to claim 6,
wherein the system furthermore comprises an acquirer configured to acquire an actual value of at least one air conditioning system operating parameter characteristic of an operating state of the air conditioning system, and controller is further configured to control the operation of the auxiliary power unit in dependence on the actual value of the air conditioning system operating parameter.

8. The system according to claim 7,
wherein at least one of the heating or cooling requirement of the aircraft region to be air-conditioned, an air conditioning system capacity utilisation parameter characteristic of a capacity utilisation state of the aircraft air conditioning system and an air conditioning system fault parameter characteristic of an apparatus fault or a system fault of the aircraft air conditioning system is used as the air conditioning system operating parameter.

9. The system according to claim 6,
wherein the acquirer configured to acquire the process air flow parameter actual value is integrated in the aircraft air conditioning system and includes signals which are also used to control the operation of the aircraft air conditioning system.

10. The system according to claim 7,
wherein the acquirer configured to acquire the air conditioning system operating parameter actual value is integrated in the aircraft air conditioning system and includes signals which are also used to control the operation of the aircraft air conditioning system.

11. The system according to claim 7,
wherein at least one of the acquirer configured to acquire the process air flow parameter actual value and the acquirer configured to acquire the air conditioning system operating parameter actual value is configured to continuously acquire at least one of the process air flow parameter actual value and the air conditioning system operating parameter actual value.

12. Use of at least one of (a) a method for controlling operation of an auxiliary power unit supplying an air conditioning system of an aircraft with compressed process air in ground operation of the aircraft, comprising (i) determining a heating or cooling requirement of an aircraft region to be air-conditioned, (ii) determining a desired value of at least one process air flow parameter for a process air flow in a region between the auxiliary power unit and the air conditioning system in dependence on the heating or cooling requirement of the aircraft region to be air-conditioned determined in step (i), the process air flow parameter being characteristic of the properties of a flow of compressed process air which is tapped off from the auxiliary power unit and supplied to the aircraft air conditioning system, wherein at least one of a volume flow, a mass flow, a temperature and a pressure of the compressed process air supplied to the aircraft air conditioning system by the auxiliary power unit is used as the process air flow parameter, (iii) controlling the operation of the auxiliary power unit in dependence on the process air flow parameter desired value determined in step (ii), (iv) acquiring an actual value of the at least one process air flow parameter characteristic of the properties of the process air flow in said region between the auxiliary power unit and the air conditioning system, (v) comparing the process air flow parameter actual value with the process air flow parameter desired value and (vi) controlling the operation of the auxiliary power unit in dependence on a result of comparison in step (v) of the process air flow parameter actual value with the process air flow parameter desired value and (b) a system for controlling the operation of an auxiliary power unit supplying an air conditioning system of an aircraft with compressed process air according to claim 7 when the aircraft is operating on the ground.

* * * * *